United States Patent
Kadapurath et al.

(10) Patent No.: US 12,288,201 B2
(45) Date of Patent: *Apr. 29, 2025

(54) METHOD AND SYSTEM FOR CENTRALIZED CHECKOUT PROCESS

(71) Applicant: Target Brands, Inc., Minneapolis, MN (US)

(72) Inventors: Jobin Kadapurath, Minneapolis, MN (US); Peter Guidarelli, Minneapolis, MN (US); Daniel Maas, Minneapolis, MN (US); Ramesh Thennadil, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,696

(22) Filed: Oct. 19, 2023

(65) Prior Publication Data

US 2024/0127216 A1 Apr. 18, 2024

Related U.S. Application Data

(63) Continuation of application No. 16/213,523, filed on Dec. 7, 2018, now Pat. No. 11,823,156.

(51) Int. Cl.
*G06Q 20/20* (2012.01)
*G06F 9/54* (2006.01)
*G06K 7/14* (2006.01)
*G06Q 30/0601* (2023.01)

(52) U.S. Cl.
CPC ........... *G06Q 20/208* (2013.01); *G06F 9/547* (2013.01); *G06K 7/1413* (2013.01); *G06Q 30/0633* (2013.01)

(58) Field of Classification Search
CPC .. G06Q 20/208; G06Q 30/0633; G06F 9/547; G06K 7/1413
See application file for complete search history.

(56) References Cited

U.S. PATENT DOCUMENTS

| | | | |
|---|---|---|---|
| 7,305,355 B2 | 12/2007 | Tarvydas et al. | |
| 10,296,962 B2* | 5/2019 | Abraham | G06Q 30/06 |
| 11,823,156 B2* | 11/2023 | Kadapurath | G06Q 20/202 |
| 2003/0216981 A1 | 11/2003 | Tillman | |
| 2005/0177448 A1 | 8/2005 | Fu et al. | |
| 2006/0167812 A1 | 7/2006 | Bhambri et al. | |
| 2014/0229327 A1 | 8/2014 | Khanna | |

FOREIGN PATENT DOCUMENTS

WO 0041520 A2 7/2000

OTHER PUBLICATIONS

U.S. Pat. No. 11,823,156 B2, issued for U.S. Appl. No. 16/213,523 (parent), on Nov. 21, 2023, 24 pages.

* cited by examiner

*Primary Examiner* — Paul Danneman
(74) *Attorney, Agent, or Firm* — Merchant and Gould, PC

(57) ABSTRACT

Methods and systems for processing an order are disclosed. A unified shopping cart receives a first request from a first tenant interface and second request from a second tenant interface, different from the first tenant interface. Each request includes first request data including a customer identifier, a selection of one or more items, and a desired delivery mode. The first request and the second request are associated with the same customer, and are processed using a unified payment transaction.

20 Claims, 10 Drawing Sheets

| Activity | Digital | In-Store |
|---|---|---|
| Shopping (cart) 602 | Add item 622 | Select Item 668 |
|  | Price 624 |  |
|  | Add delivery instructions 626 | Scan items into POS cart 640 |
|  | Price and promotion 628 |  |
|  | Add payment information 660 | Press total (charge to payment processing) 642 |
|  | Final price and promotion 662 | Final price and promotion 644 |
|  | Calculate tax 664 |  |
| Checkout 604 | Submit 650 |  |
|  | Authorize payment 652 |  |
|  | Commit order 652 |  |
| Fulfillment 606 | Reserve Inventory 670 | Not performed by POS because carry out only 660 |
|  | Allocate 672 |  |
|  | Reserve at node 674 |  |
|  | Ship/Pick up 676 |  |
| Invoice 608 | Invoice 678 |  |
|  | Settle 680 |  |

FIG. 6

METHOD AND SYSTEM FOR CENTRALIZED CHECKOUT PROCESS

TECHNICAL FIELD

The present disclosure relates generally to methods and systems for centralizing the checkout process of a retailer. More particularly, the present disclosure describes a system including a unified shopping cart across one or more tenants.

BACKGROUND

Many retailers have both an online and brick-and-mortar presence. Consumers are able to purchase items from the retailer, but cannot combine online with in-store purchases into a single checkout. Retailers traditionally use separate technologies for in-store point of sale (POS) systems and mobile/web checkouts. This requires a separate checkout for both in-store and online purchases.

Retailers often also have multiple separate sales transaction processing systems at different sales channels. For example, POS systems operate as a separate checkout process entirely from web or mobile checkout processes. Additionally, third party checkout systems are added to the web/mobile checkout experience but this is not done in a standardized manner and therefore makes it difficult to integrate a retailer checkout into a third party website (for example, Google.com).

The current infrastructure provides disadvantages to customers and retailers, because it requires separate transactions for different sales channels. Further, as the distinctions between sales channels blur due to online order combinations with in-store pickup (by the customer or third party services) the time of payment and manner of payment cannot easily be adjusted in existing systems, such that an online order must be paid for at the time of order rather than the time at which goods are either picked up or delivered. Therefore, flexibility in payment systems across channels that allow for flexible rules regarding payments and easy integration with third party websites and services are desirable.

SUMMARY

In summary, the present disclosure relates to methods and systems for processing an order at a unified shopping cart. The unified shopping cart receives request data from at least one tenant interface, and settling a unified payment transaction associated with the request data.

In a first aspect, an enterprise checkout system is described. The system includes a unified shopping cart communicatively connected to a plurality of service APIs. The plurality of service APIs expose each of a plurality of corresponding services providing item or transaction attribute data useable in a sales transaction. The system also includes a plurality of tenant interfaces communicatively interfaced to the unified shopping cart. The plurality of tenant interfaces are each associated with a different one or more sales channels including at least a point-of-sale tenant interface and a digital tenant interface. Each of the plurality of tenant interfaces are configured to provide, in response to a request from a user, request data including a customer identifier, a selection of one or more items, and a desired delivery mode. The unified shopping cart is configured to receive request data from one or more of the plurality of tenant interfaces, and settling a unified payment transaction associated with the request data. The unified payment transaction is based on one or more sets of request data associated with the customer identifier.

In another aspect, a method of processing an order is described. The method includes receiving at a unified shopping cart, a first request from a first tenant interface of a plurality of tenant interfaces. The first request includes first request data including a customer identifier, a selection of one or more items, and a desired delivery mode. The unified shopping cart also receives a second request from a second tenant interface of a plurality of tenant interfaces different from the first tenant interface. The second request includes second request data including a second customer identifier and a second selection of one or more items. The second customer identifier received as part of the second transaction data is identified as being associated with a same customer as the customer identifier received as part of the first transaction data. Based on identifying the second customer identifier and the first customer identifier as being associated with the same customer, settling a unified payment transaction including items identified in the first request data and the second request data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 6 illustrates an example block diagram of a side-by-side checkout process for a digital checkout and an in-store checkout.

DETAILED DESCRIPTION

Figure 1:
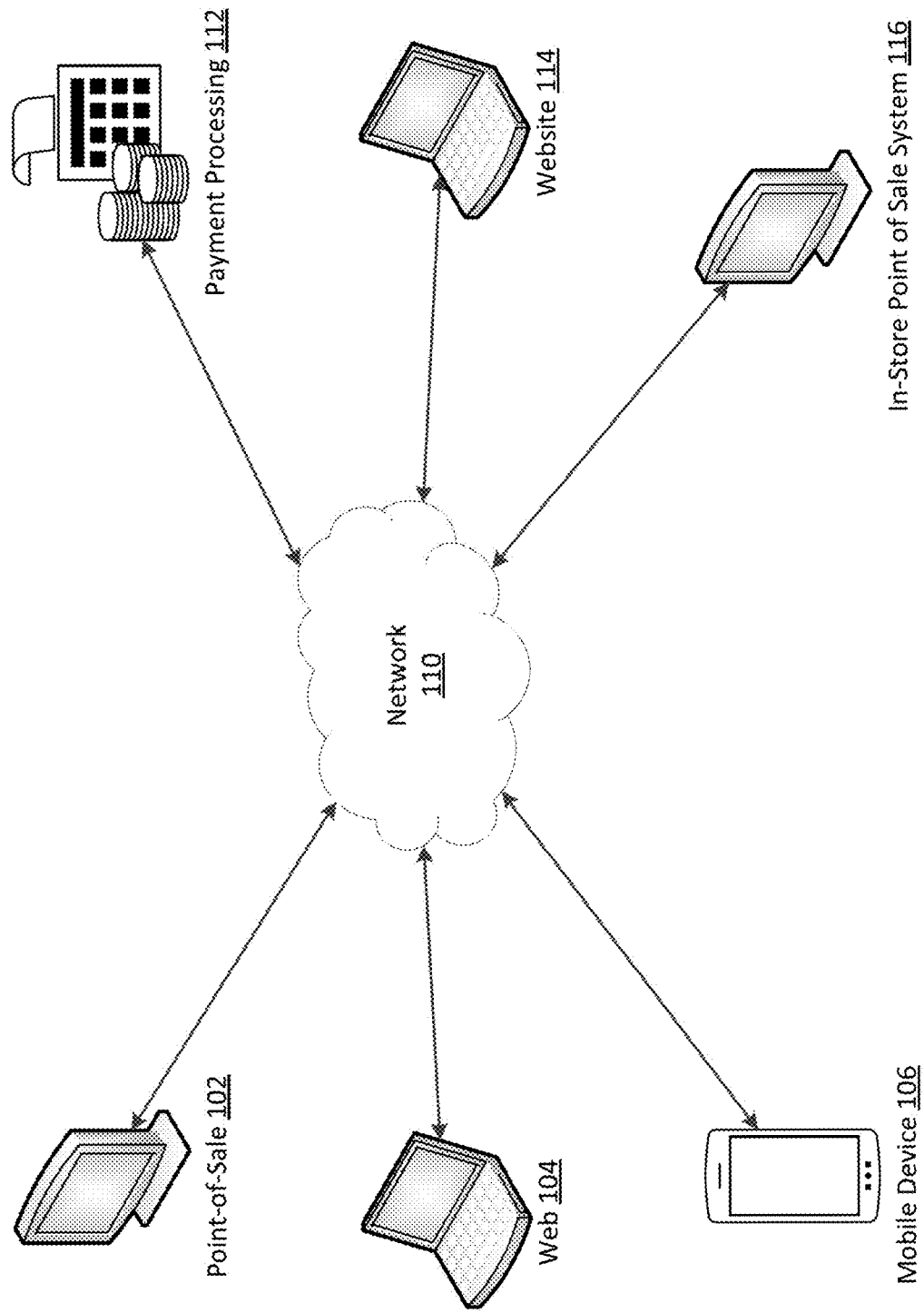
FIG. 1 illustrates a schematic diagram of an example enterprise checkout network.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Traditionally, checkout capabilities are split into two tenant areas: digital and in-store. A distinctive difference is how merchandise gets into the hands of the customer. Stores are primarily a carryout-based checkout process, where customers select items from a shelf and physically put them in a cart. The checkout process is generally carried out by a retail worker. Sales invoices are created directly to the finance system to support financial processing, reporting, payment settlement, and inventory relief.

Within a digital space, the checkout process is initiated by a customer, such as by accessing the online presence of the retailer or accessing a marketplace that includes items from the retailer. When ordering online, the customer receives their items (or services) after an order has been created. The order is then processed and the items are shipped to the guest, or picked up by the customer at a retail location.

In general, the present disclosure is directed towards a system to centralize user cart operations into an integrated, enterprise-wide checkout process, including an enterprise cart. This will allow a user to add items to a cart online or in an application, and select additional items in-store, and perform a single checkout process on that combination of items (e.g., in a single transaction combining store pick up and in-store shopped items). This allows for a common cart and item checkout process across both digital and in-store systems, including third party digital platforms.

Such an arrangement may provide simplified checkout processes for users. For example, a user may opt to purchase some items online for in-store pickup, and when the user arrives at the store, that user may select additional items for purchase. A unified cart will allow a single transaction to be processed that includes payment for both the pickup and the added items. In another example, a user may elect to shop in-store for items, and a particular item may be out of stock. The user could, using a mobile application, scan an item code for the item, thereby adding the out-of-stock item to his/her cart. When the user checks out in store with the other items that user has selected, the user may pay for items purchased in store and the out-of-stock item in a single transaction, and that out-of-stock item can be shipped to the user from another location (e.g., another store or a warehouse). In a still further example, a user may select items online for purchase, and may elect to have those items delivered by, e.g., a third party delivery service. The third party delivery service may utilize a person who is required to check out at the time items are obtained from a delivery location; in typical circumstances, the third party delivery service would pay for the item at that point, having previously charged the user for the service and items. By using a unified cart, the third party delivery service can be linked to that cart, and the user may be only charged for items at the time of checkout, rather than in advance. This removes the possibility that the user is charged for an item that the third party delivery service cannot fulfill, e.g., because the retail location is out of stock of that particular item.

As outlined in the present disclosure, the above scenarios are accomplished through a revised underlying shopping cart architecture that is linked to a number of different point of sale interfaces (e.g., online, in store, third party, etc.). Such an architecture as described herein, in which many interfaces are linked to a single unified shopping cart for each user, allows a substantially simplified shopping experience.

FIG. 1 illustrates an example environment in which an enterprise checkout system may be implemented. Multiple devices and services interact through a network 110. Web 104 and mobile devices 106 may be used to access a retail website 114 of a retailer. In alternative embodiments, the retail website 114 may be that of a third party, the third party having products for sale of the retailer. A point-of-sale (POS) system 102 may process orders placed online through the retailer's website 114 or the website of a third party retailer, such as www.google.com or www.alibaba.com. Orders completed in store are processed through an in-store POS system 116. The POS system 102 and the in-store POS system 116 use a payment processing system 112 to complete orders. In the enterprise checkout system, the payment processing system 112 can process orders that are entered in the POS system 102 and the in-store POS system 116 together.

Figure 2:
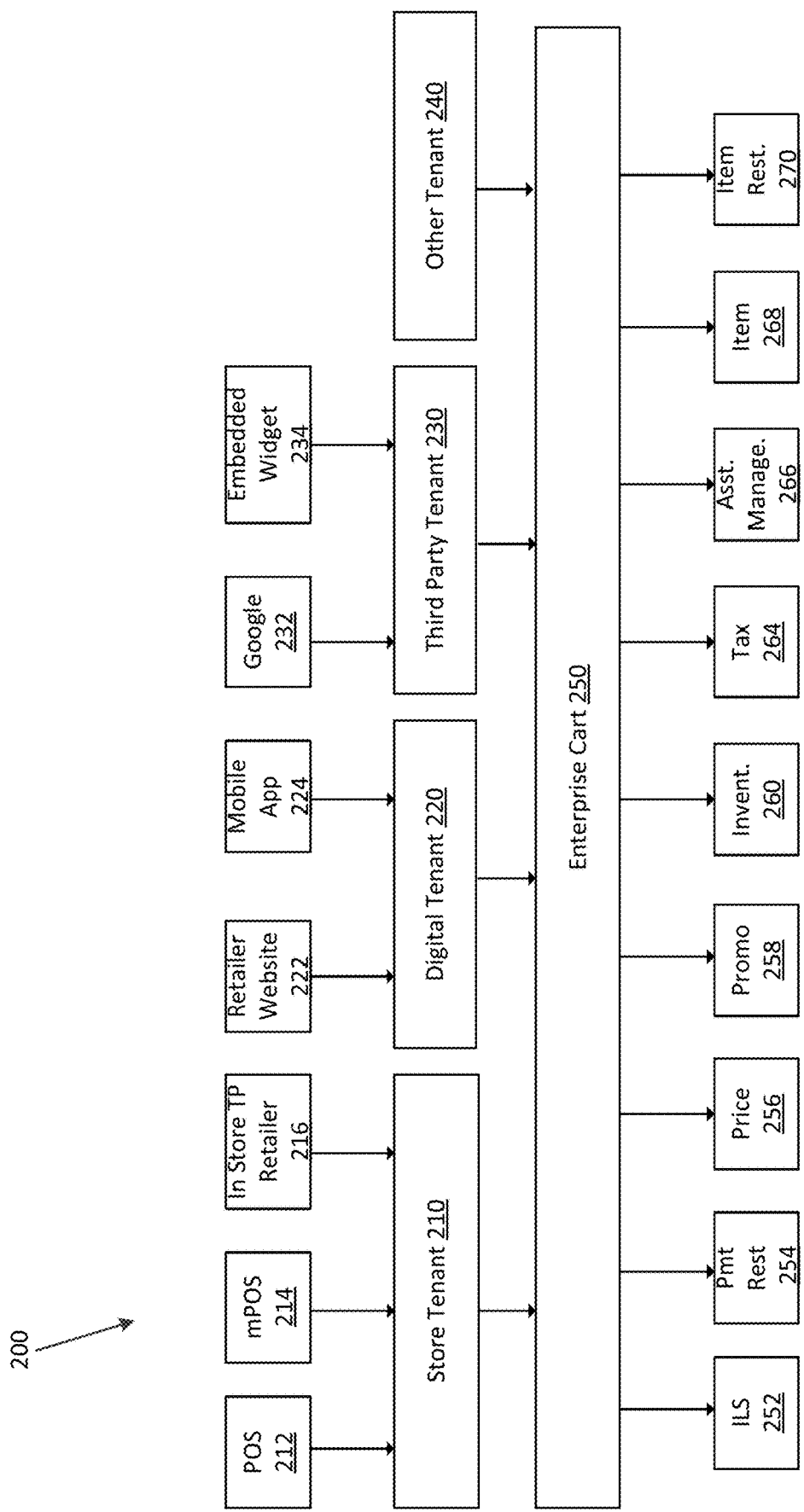
FIG. 2 illustrates a schematic diagram of an example enterprise cart management system.

FIG. 2 illustrates an example block diagram of an enterprise checkout system 200 as described herein. The enterprise cart 250 manages the containers of data that includes inputs and outputs from multiple APIs for each user that has an associated local cart, and is configured to receive inputs from a plurality of tenant interfaces. Example tenant interfaces include a store tenant 210, a digital tenant 220, a third party tenant 230, and/or other tenant 240. A store tenant 210 may include a retailer with a brick-and-mortar store. A digital tenant 220 may include a retailer with only an online presence, or a brick-and-mortar retailer with an additional online presence. A third party tenant 230 may include businesses that sell products on behalf of other retailers. Example third party tenants 230 include Alibaba (www.alibaba.com) or Google (www.google.com). Other tenants 240, also referred to as intermediary tenants, may include businesses that shop on behalf of a customer and/or provide delivery services for those customers. Example other tenants 240 include third party delivery services, such as Shipt®.

In the embodiment shown, the enterprise cart 250 is configured to contain data including, for any particular user: a list of items to buy and associated quantities; a physical delivery address or pick-up instructions; payment types and payment amounts; promised item price; estimated taxes; line item offers; and cart level offers. The enterprise cart 250 receives this information by communicating with the tenants and other APIs.

In the embodiment shown, the store tenant 210 receives inputs from a POS system 212, a mobile POS system 214, and/or in-store third party retailer 216. Inputs received at a POS system 212 are inputs from an in-store retailer, such as when a customer is at a checkout counter. Inputs received from a mobile POS system 214 are inputs received at a website of the retailer or inputs received from a mobile register. Inputs received from an in-store third party retailer 216 include orders placed when a customer is at the checkout counter of a third party retailer within the store tenant's brick and mortar location.

In the embodiment shown, the digital tenant 220 receives inputs from a retailer website 222 and/or a mobile application 224. Inputs received from a retailer website 222 are orders placed on the website of the retailer. Inputs received from a mobile application 224 are orders placed on a mobile application of the store tenant. Customers may shop on at a mobile application and place orders similar to orders placed on a retailer website. Once these items are received at the online cart, the online cart communicates with the enterprise cart 250.

The third party tenant 232 may be a tenant such as Alibaba (www.alibaba.com) or Google (www.google.com) (or other aggregate online retailer) 232 and/or the embedding of a cart widget into a third party retailer website. Inputs received at an example third party tenant 230 may be orders comprising at least one item, placed through the third party tenant 230, where the items are sold by the retailer. Inputs received at an embedded cart widget 234 are similar to inputs received at a third party tenant 230. Inputs received at the third party tenant 230 or embedded cart widget 234 are processed at the enterprise cart 250.

Other tenants 240 may be businesses such as shipping companies or businesses that shop and delivery items on behalf of a customer, such as Shipt®. In a first example, items are selected for purchase at the other tenant 240 interface, where the items are sold by a retailer. In an alternative example, items are selected for purchase through the digital tenant 220 interface and are communicated to the other tenant 240.

When an order is placed at any of the tenants, it is processed through the enterprise cart 250. The enterprise cart 250 takes the information received from the tenants, and communicates with other APIs to complete the transaction. Example APIs include Inventory Location Services (ILS) API 252, payment restriction API 254, price API 256, promotional API 258, inventory API 260, asset management API 266, tax API 264, item API 268, and item restriction API 270. In other embodiments, more APIs communicate with enterprise cart 250. Still further, enterprise cart 250 communicates with APIs on a need to know basis.

ILS API 252 receives inputs from enterprise cart 250 requesting the location of one or more items. ILS API 252 determines where the items are located, how many of each item are located at each location, and which location is best suited to provide the items. In a first example, the input may include a request to ship the items, so the ILS API 252 determines which location or locations should ship the items. In another example, the input includes a request to pick up the items at a specified location. The ILS API 252 determines whether the items are already located at that location, or whether the item needs to be delivered to that specified location for pickup by the customer.

Payment Restriction API 254 receives inputs including a request to pay for an order in a specified way. The payment restriction API 254 determines whether that payment may be used to purchase the items and reports that information back to the enterprise cart 250. For example, WIC payments may be used to purchase food, but not sports equipment.

Price API 256 receives the selected item and outputs the price associated with the item. Price API 256 is also able to calculate the price of multiple items, including when a sale price is associated with the items.

Promotional API 258 receives the selected items and determines if the item is associated with an offer or other promotion. If the item is associated with an offer or promotion, the promotional API 258 communicates the information to the enterprise cart 250.

Inventory API 260 is receives the selected item and associated quantity. The inventory API 260 identifies where an adequate amount of inventory is located and communicates this to the enterprise cart 250. The enterprise cart 250 receives a list of inventory locations and communicates this with the ILS API 252 to determine the best location to reserve the inventory.

Asset Management API 266 maintains information pertaining to all items within the enterprise retail system. Asset management API 266 communicates with other APIs to determine where items are located, how many items are located at a specified location, when items are sold-out, and tracking other similar information.

Tax API 264 receives item information, such as the item, tax category associated with the item, and location of delivery or pickup to determine applicable taxes associated with the items. Tax API 264 determines the tax rate based on the item, tax category associated with the item, and the location of delivery or pick-up, and communicates the tax amount back to the enterprise cart 250.

Item API 268 provides item level details to item services endpoints. Details include an item description, item identifier, item name, subscription eligibility, related items, taxability and tax product classification, restrictions information, and item descriptions.

Item restriction API 270 is responsible for evaluating the items in the cart. Based on which items are added to the cart, the item restriction API 270 applies business rules specified by merchants or other business parties to indicate whether a specified product can be sold. Example item restrictions are age restrictions on liquor or video games, time restrictions for liquor, quantity restrictions on limited quantity items, or gift card purchase amounts.

Other services or APIs may communicate and be accessed by enterprise cart 250 as needed. As described below, more services or APIs are envisioned.

Figure 3:
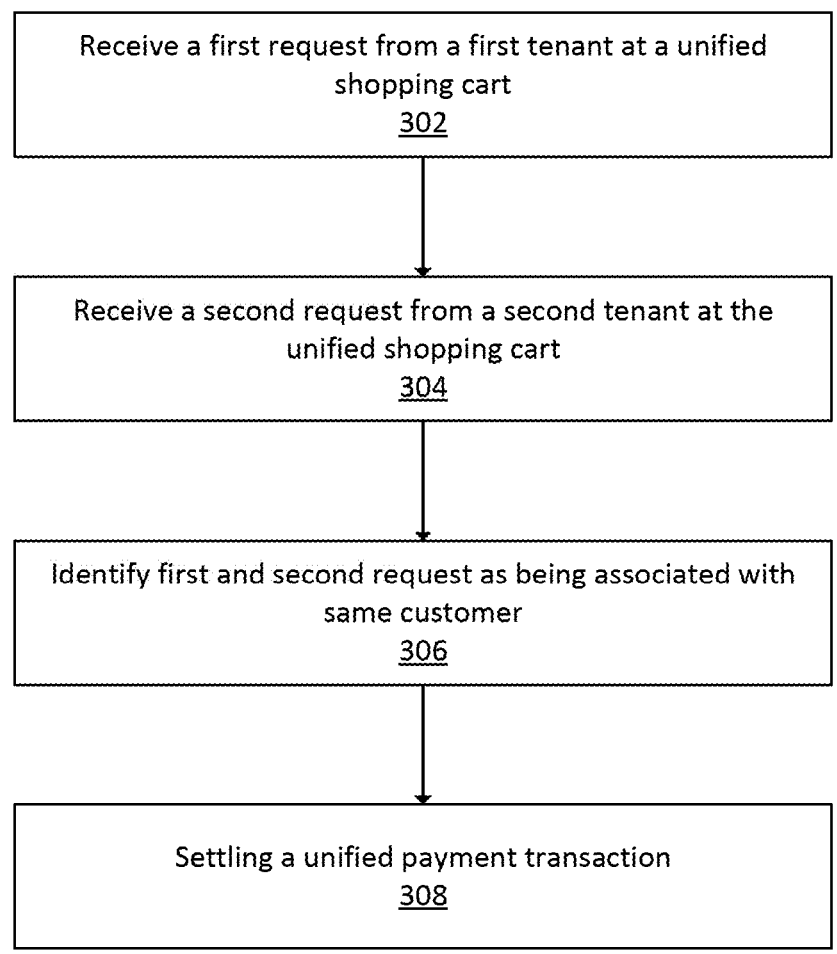
FIG. 3 illustrates an example process of purchasing items both online and in-store.

FIG. 3 illustrates an example flowchart of a method 300 of processing an order utilizing an enterprise cart or an enterprise shopping experience. An enterprise cart may also be referred to as a unified shopping cart. The method 300 represents an example sequence in which the enterprise cart is used, in which advantages of the enterprise cart architecture are realized.

At step 302, a first request from a first tenant is received at a unified shopping cart. The first request may be received from a first tenant interface selected from a plurality of tenant interfaces. A first tenant interface may include, but is not limited to, a store tenant, a digital tenant, a third party tenant, or an intermediary tenant.

The first request includes first request data including a customer identifier, a selection of one or more items, and a desired delivery mode. In an example, a customer identifier may be a user ID used to log into an account on a website or mobile application. Alternatively, a customer identifier may be inferred from a payment method, such as a credit card, or having an in-store employee checking a customer identification card. A selection of one or more items may include a customer selecting items online or may include selecting an item and having it scanned at a register in a store. A desired delivery mode includes having the items delivered, reserving the items for in-store pickup, or other similar means of receiving the item. Still further, a desired delivery mode may be implied as pick-up or NA when the customer is already in-store.

At step 304, a second request from a second tenant is received at the unified shopping cart. The second request may be received from a second tenant interface selected from a plurality of tenant interfaces, different from the first tenant interface. A second tenant interface may include, but is not limited to, a store tenant, a digital tenant, a third party tenant, or an intermediary tenant.

The second request includes second request data including a customer identifier, a selection of one or more items, and a desired delivery mode. In an example, a customer identifier may be a user ID used to log into an account. Alternatively, a customer identifier may be inferred from a payment method, such as a credit card, or having an in-store employee checking a customer identification card. A selection of one or more items may include a customer selecting items online or may include selecting an item or having it scanned at a register in a store. A second request does not necessarily need to include a desired delivery mode. A second desired delivery mode includes having the items delivered, reserving the items for in-store pickup, or other similar means of receiving the item. Still further, a desired delivery mode may be implied as pick-up or NA when the customer is already in-store.

At step 306, the identification of the customer identifier of the first and second request is identified as being associated with the same customer. The customer is the individual placing the request comprising at least one item at one of the tenant interfaces. Customers may be identified by a user ID, a payment authorization request from a credit card, an identification, or other similar means for confirming the identification of a customer.

In accordance with the present disclosure, identification of the customer in the first and the second request as the same customer adds the selected item associated with both the first and second request into the same enterprise cart object. Accordingly, subsequent settlement (purchase) of those items allows for settlement across both in-person and online purchasing interfaces.

At step 308, a transaction is settled when the first customer identifier and the second customer identifier are associated with the same customer. A unified payment transaction including items identified in the first request data and the second request data is settled.

Figure 4:
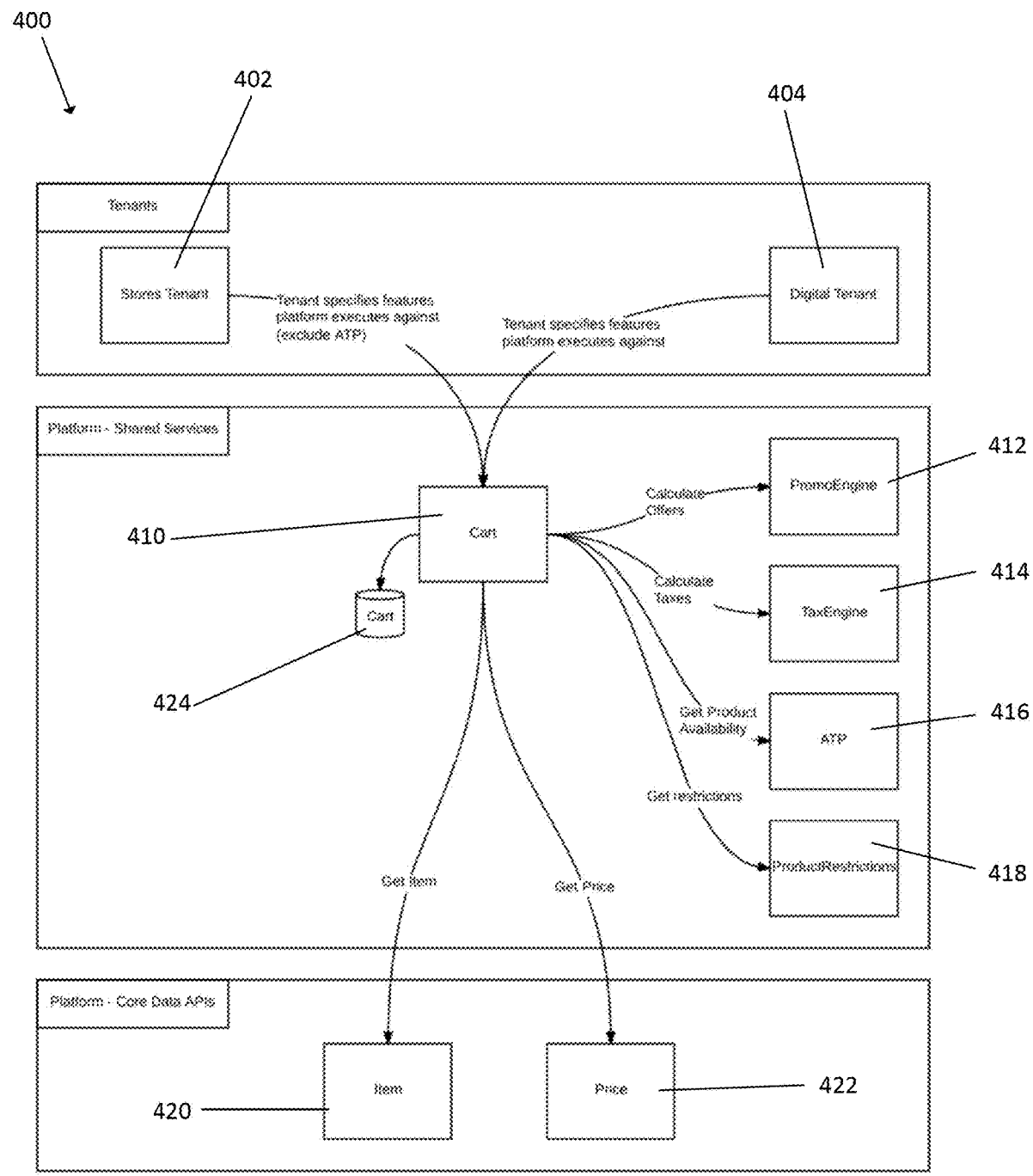
FIG. 4 illustrates an example block diagram of tenant and platform interactions of an enterprise-wide checkout platform.

FIG. 4 illustrates an example interaction 400 between tenant interfaces, shared services platforms, and core data APIs. In an example, a store tenant 402 and a digital tenant 404 receive a request for an order and send application information regarding a selection of at least one item to an enterprise cart 410. It should be noted that other tenants might receive a request for an order, including third party tenants, and other tenants. The selection of at least one item is received at the enterprise cart 410. Once the enterprise cart 410 receives the selection of at least one item, the enterprise cart 410 sends a request to receive information regarding the at least one item to complete the transaction. The enterprise cart 410 communicates with other API's from shared services platforms to receive application information to complete the transaction.

Example shared services platforms include the following. A promotional engine 412 determines if the at least one item is associated with an offer or other promotion. The promotional engine 412 receives information associated with the item placed in the cart. If the item is associated with an offer or promotion, the promotional engine 412 communicates that back to the enterprise cart 410.

A tax engine 414 calculates the taxes, based on the item, as well as where the item is purchased. The tax engine 414 calculates tax rates and jurisdictional fees associated with the item and/or services in the enterprise cart 410. In addition to the item price and the tax product class code for each item, and the address associated with a pickup location is used to calculate taxes. A pickup location is either the shipping destination, the pickup location, or the location of the retailer if the items are purchased in-store.

An available to promise (ATP) engine 416 determines product availability of the at least one item. The ATP engine 416 can determine when and where an item may be available. For example, when a customer selects an item at the retailer website or mobile application, the ATP engine 416 determines how many items are available and if there is an adequate quantity to fulfill the purchase. If there is an adequate quantity to fulfill the purchase, the ATP engine 416 reserves the inventory when the order is placed. If there is not adequate quantity to fulfill the purchase, the ATP engine 416 communicates that information to the enterprise cart 410, so the customer is aware that the order cannot be processed. The customer may be presented with the option to select a different item, to be notified when the item is available again, or to place the order on hold.

A product restriction engine 418 determines if there are any restrictions for purchase of the at least one item. If there are no restrictions for purchase of the at least one item, the product restriction engine 418 does nothing further. If there are restrictions for purchase of the at least one item, the product restriction engine 418 communicates to the enterprise cart 410 that the transaction cannot be processed further until the restriction conditions are met. For example, if alcohol is selected for purchase, the item is flagged by the product restriction engine 418 until the customer provides age identification.

The enterprise cart 410 can also communicate with core data APIs. Core data APIs include item engine 420 and price engine 422. Item engine 420 provides item information such as subscription eligibility, related items, taxability, tax product classification, restriction information, and item descriptions. Price engine 422 calculates the price of each item and the total price. Price engine 422 retrieves the list price and/or the sales price of each item. The price engine 422 also calculates the total price of the items in the cart, including the price of the items and any additional costs, such as tax and shipping costs.

The enterprise cart 410 can also communicate with cart API 424, representing an individual cart from one tenant. The cart API 424 includes functionality such as the ability to create and destroy a cart in a tenant interface. The cart API 424 also can add and remove items; update item quantities; taxability status; and price overrides; price the cart total including discounts and taxes; add and remove fulfillment instructions; and add or remove payment types. Cart API 424 can also report significant audit, security, and telemetry event information.

Figure 5:
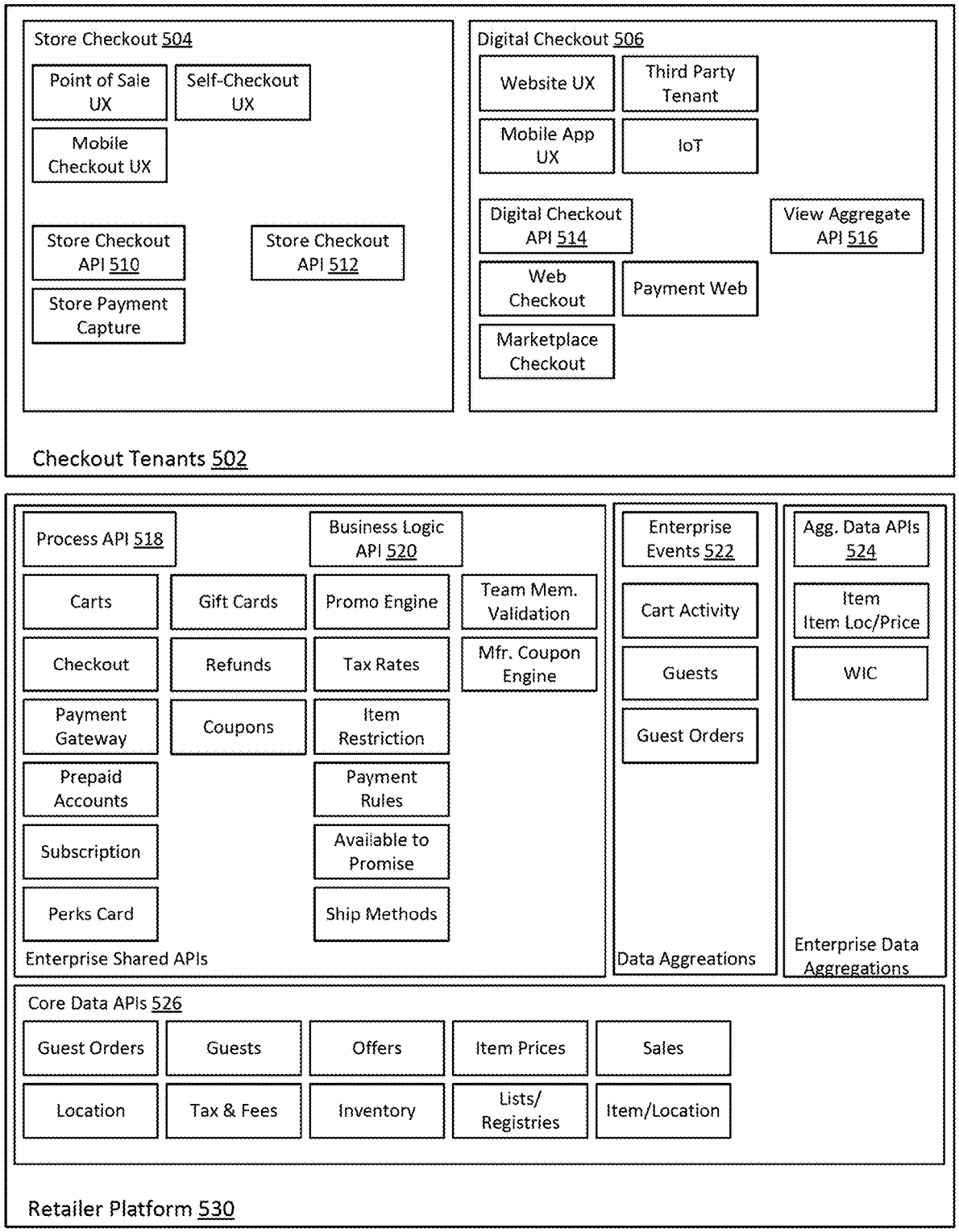
FIG. 5 illustrates an example block diagram of the enterprise checkout platform.

FIG. 5 illustrates the relationship between existing APIs on different levels of a platform for an enterprise cart system 500, according to a particular implementation of an integrated enterprise cart system according to the present disclosure. The platform APIs can be orchestrated to build and manage a cart and create an order in the enterprise cart system 500.

Events and services interact across some or all of the tenants, platforms, and products. The enterprise cart system 500 uses store checkout APIs 510, aggregate APIs 512, digital checkout APIs 514, aggregate APIs 516, process APIs 518, business logic APIs 520, enterprise events API 522, aggregate data APIs 524, and core data APIs 526.

A store checkout API 510 allows for both online purchases as well as marketplace checkouts. The store checkout API 510 includes functionalities such as establishing context for using platform level cart and checkout APIs, such as specifying which behaviors should be executed when adding an item to the cart, handling error or warning conditions from the platform level APIs and returning relevant actions to the user interface, composite APIs that implement entire end-to-end workflows like express checkout, interactions with platform level APIs like guest to order to access guest profile information like addresses and payment instructions, interactions with other tenant level APIs like payment capture, and interactions with tenant level view aggregation APIs.

A store checkout API 510 further specializes the cart and checkout functionality available at the platform layer. Functionalities include establishing context for using platform level cart and checkout APIs, such as specifying which behaviors should be executed when adding an item to the cart; handling error or warning conditions from the platform level APIs and returning relevant actions to the user interface; composite APIs that implement entire end-to-end workflows such as express checkout; resolution of UPC barcodes to TCINs to support adding legitimate TCINs to the cart; manage interactions with platform level APIs such as "Guest" in order to access guest profile information such as address and payment instructions; manage interactions between other tenant level APIs and payment capture; manage interactions with tenant level view aggregation APIs; and calculate totals specific to user experiences.

Checkout tenants include a store checkout platform 504 and digital checkout platform 506, each of which utilize their own APIs. Third party tenants and other tenants may also have their own checkout platforms, and may function the same or similar to the store checkout platform 504 and digital checkout platform 506. The store checkout platform 504 includes a point-of-sale user experience design, mobile checkout user experience design, and self-checkout user experience design.

The store checkout platform 504 also includes store checkout APIs 510 and store payment capture API. Store checkout APIs 510 implement functionality necessary to "check out" a cart and create an order. The store checkout API 510 creates an order by verifying cart contents, including determining items that are not restricted, payment types that are not restricted, items have a price, items are available for fulfillment, and items have appropriate fulfillment instructions specified for fulfillment methods. Store checkout API 510 also authorizes payments as appropriate, activates and enable products needing immediate fulfillment at order creation, including prepaid activations and gift card loans, create guest orders, and post guest order to guest order topic.

Store checkout API 510 has functionalities such as: establishing context for using platform level cart and checkout APIs, such as specifying which behaviors should be executed when adding an item to the cart; handling errors or warning conditions from the platform level APIs and returning relevant actions to the user interface; composite APIs that implement entire end-to-end workflows, such as express checkout; resolution of UPC barcodes to TCINs to support adding only legitimate TCINs to the cart; interactions with platform level APIs like "Guest" in order to access guest profile information, such as addresses and payment instructions; interactions with other tenant level APIs, such as payment capture; interactions with tenant level view aggregate APIs; and calculations of totals specific to stores' user experiences.

Store payment capture API captures payment information between in-store transactions and digital transactions. For example, store payment capture API captures EMV payment information using an encrypted payment device, such as a Verifone® payment terminal. Other examples includes capturing clear-text payment account numbers within the digital user interface, encrypting the information, and processing the data using a secure region.

A payment capture API captures EMV payment information using an encrypted payment device, such as a Verifone® payment terminal, and captures clear-text payment account numbers with the .com user interface, subsequent encryption, and processing of the data using a secure region.

The store checkout platform 504 also includes aggregate APIs 512.

Digital checkout platform 506 includes a website user experience design, a mobile application user experience design, a third party seller user experience design (such as Alibaby.com or Google.com), and an internet-of-things (IoT) application interface. Digital checkout APIs 514 include web checkout, marketplace checkout, and a web payment. Aggregate APIs 516 provide a view of historical sales data, historical purchases, items aggregated from multiple tenants, search history, and other information captured at the guest level.

A web checkout API and marketplace checkout API have the following functionalities: establish context for using platform level cart and checkout APIs, such as specifying which behaviors should be executed when adding an item to the cart; handling errors or warning conditions from the platform level APIs and returning relevant actions to the user interface; implement entire end-to-end workflows, such as express checkout; facilitate interactions with platform level APIs, such as "Guest," in order to access guest profile information, such as address and payment information. In some embodiments, the web checkout API also supports capabilities such as displaying information for all products with the same SCIN and fulfillment strategy.

Further, in example embodiments, the PaymentWEB API captures payment information between in-store transactions and digital transactions. For example, PaymentWEB API captures EMV payment information using an encrypted payment device, such as a Verifone® payment terminal. Other examples includes capturing clear-text payment account numbers within the digital user interface, encrypting the information, and processing the data using a secure region.

A retailer platform 530 is interfaced to the checkout tenants 502, and hosts a common services architecture as well as the enterprise cart infrastructure that is common among all such tenants. The retailer platform 530 includes, in the embodiment shown, process APIs 518, business logic APIs 520, enterprise events API 522 data aggregation, and aggregate data APIs 524. Process APIs 518 include store checkout APIs 510 such as cart API and checkout API.

The cart API is used to manage a cart during a shopping experience, which allows a customer to create (or destroy) a cart comprising items for purchase. The cart API is able to add and remove items; update item quantities; update taxability status; update price overrides; price the cart including discounts and taxes; add or remove fulfillment instructions; and add or remove payment types.

A checkout API implements functionality necessary to manage a cart used during a shopping experience. The checkout API verifies cart contents, including items that are not restricted, payment types are not restricted, that items have a price, that items are available for fulfillment, and that items have appropriate fulfillment instructions specified for fulfilment methods. The checkout API is also functional to authorize payments, activate and enable items needing immediate fulfillment at order creation, create guest orders, and post the guest order.

Other APIs in the process APIs 518 include payment gateway API, prepaid accounts API, subscriptions API, loyalty card API, gift card API, refund API, and coupon API. Payment gateway API authorizes payments using EKMC or tokenized payment information against First Data or a retailer gift card system. A prepaid account API activates and deactivates prepaid service items, such as gift cards for e-commerce sites.

Subscription API determines if the item or items are eligible for subscription pricing, and determines if the item or items should be ordered or placed in the enterprise cart automatically at regular intervals.

Loyalty card API determines if the customer is associated with a loyalty card that may affect item pricing, or other pricing, such as shipping costs.

A gift card API is functional to issue, load value to, inquire the balance or, redeem value from, and settle transactions for gift cards. The gift card API is utilized for gift cards specific to the merchant, not general gift cards such as credit card gift cards.

Refund API functions to issue refunds if an item is returned. The refund API determines when the refund should be issued and how the refund should be issued. Refund API may communicate with return authorization API. A return authorization API determines whether a specified item can be returned and the value that should be returned to the guest as specified when the item was sold.

The coupon API validates coupon identifiers and returns associated with the merchant's offers for coupons. The coupon API is also able to validate coupons within an application. The coupon API may also validate offers in a store loyalty application by resolving a user ID and return associated offers within the mobile application associated with the user ID.

Business logic APIs 520 includes promotional engine API, tax rate API, payment restriction API, ATP API, shipping method API, and team member validation API.

A promotion engine API is accessible to use the evaluation endpoint to calculate discounts for a cart given a list of items, payment types, and amounts, coupons, and shipping and handling instructions. Discounts are calculated and returned for association with cart items.

A tax rate API calculates sales tax and jurisdictional fees associated with items and services in the cart. The tax rate API uses the destination location or address associated with a pickup location to determine taxes for the items that are shipped or picked up. The tax rate API calculates tax of carry out order based on the location that the item was acquired by the customer.

A payment restriction API implements logic traditionally implemented in the POS tenant space. The payment restriction API is responsible for evaluating the payment type specified for a cart against the cart's item and other payments and applying business rules indicating whether the payment type can be applied to the cart. For example, the payment restriction API determines which items in a cart that WIC may be used to purchase. Another example includes determining which items on a merchandise return card may be used. Yet another example includes limitations when using or purchasing gift cards.

An available to promise (ATP) engine determines product availability of the at least one item. The ATP engine can determine when and where an item may be available. For example, when a customer selects an item at the retailer website or mobile application, the ATP engine determines how many items are available and if there is an adequate quantity to fulfil the purchase. If there is an adequate quantity to fulfill the purchase, the ATP engine reserves the inventory when the order is placed. If there is not adequate quantity to fulfill the purchase, the ATP engine communicates that information to the cart, so the customer is aware that the order cannot be processed. The customer may be presented with the option to select a different item, to be notified when the item is available again, or to place the order on hold.

Shipping method API validates the selected shipping method available for each item. The shipping method API utilizes the item details and the shipping destination location to determine which shipping methods are available. Shipping destination location may be the customer's address or the address of a retail store for in-store pickup.

Team member validation API determines and validates if the customer is a team member. Team members may be availed special discounts or promotions.

Business logic API 520 includes item restriction API and manufacture coupon engine API. An item restriction API is responsible for evaluating the cart's items and the item(s) being added to the cart and applying business rules specified by merchants and other business parties to indicate whether a specific product can be sold. An example product restriction may include age restrictions for purchasing alcohol or age-restricted video games. Another product restriction may include a time restriction for purchasing alcohol or for pre-sale items. Yet another example is quantity restrictions when there is a limited quantity for purchase or a maximum gift card amount.

The manufacturer coupon API matches specified manufacturer coupons to items in the cart. A list of associated coupon payments that need to be applied to the cart is also created. Enterprise events API 522 includes cart activity data, guest data, and guest order data.

Cart activity data maintains historical data on a per customer per cart basis. Cart activity data can be used to track items that were placed in a cart and either subsequently purchased or removed from the cart.

Guest data stores information about guests, such as their username, preferred shipping location, and preferred payment method.

Guest order data stores information about guests, such as historical order data, subscription orders, or other similar information.

Aggregate data APIs 524 includes item location price data and WIC data. Item location price data stores information associating the price of items depending on where the item is located or where the customer is located. WIC data stores information relating to which items may be paid for using WIC.

Core data APIs 526 include guest order data, location data, guest data, token data, item data, tax and fees data, offer data, inventory data, item price data, list/registry data, sales data, and item location data.

Guest order data stores information about guests, such as historical order data, subscription orders, or other similar information. Item location data includes providing location specific item attributes, compliance program information, and selling rules associated with a specific store location and the item. Guest data stores information about guests, such as historical order data, subscription orders, or other similar information. Token data includes online tracking or browsing history—information associated with other items browsed, or related items, or item stored in a cart during a previous browsing session. Tax and fee data stores information associating taxes and fees associated with each item. Offer data stores information regarding whether an item includes a special offer. Inventory data stores inventory information on a per item, per store basis. Item price data stores pricing information on a per item basis. List/registry data stores information including items listed on each registry or list. Sales data stores information attributing sale to individual items. Item location data stores information relating to where each item is located in a supply chain.

FIG. 6 illustrates an example parallel customer shopping experience of an online transaction and an in-store transaction. In an embodiment of the current system and method, each experience may still occur in parallel, but a single checkout process occurs.

As shown, the shopping process has four basic steps: shopping (or placing item in a cart—digital or real) 602, checkout process 604, fulfillment 606, and invoice process 608. A cart is a container (real or digital) that stores items and quantities, fulfillment and delivery instructions associated with the items, and payment types necessary to create an order for the customer. Checkout process 604 is a business process that orchestrates converting a cart to an order. An order is a contract between the customer and the retailer for delivery of the items at a specified price in a specified manner (delivery or in-store pickup). Orders can be canceled systematically or by the customer. Fulfillment 606 is a business process of transferring ownership of the items from the retailer to a customer. Invoice process 608 includes creating an invoice and settling the transaction.

A digital shopping process includes adding the item 622 to a digital cart. A price 624 is associated with each item added to the cart. A user may input delivery instructions 626 if applicable, such as a shipping address or shipping to a retailer store for in-store pickup. An intermediate price and promotions 628 are calculated if applicable to the items added in the cart. Payment information 660 is added, which may include options such as pay now for a delivery order, or pay later for in-store pickup. The final price is determined 662, which includes any promotions and tax 664.

An in-store shopping process starts when a customer selects an item 668 off a shelf for purchase. A price 624 is associated with each item added to the cart. When the customer is ready to checkout, either the merchant scans the items into a point-of-sale system 340, or the customer scans the items with a mobile POS system. The item is scanned into a point-of-sale system 640, and a total price 642 is calculated. The final price is determined 644, which includes any promotions and tax 664.

The checkout process 604 for both a digital order and an in-store order follows generally the same process. The checkout process 604 includes submitting an order 650, authorize payment 652 and committing the order 654. Both the digital process and the in-store process submit an order 650 and authorize payments 652; however, only the digital process commits the order 654. The in-store process is completed at the authorize payment 652 step because the items are carried out by the customer (i.e., no additional order fulfillment process is required).

The fulfillment 606 activity is applicable in a digital purchase, but does not occur in an in-store purchase. During fulfillment 606, the inventory is reserved 670, and the items are allocated 672. The items are then reserved 674 at a specified retail location. To the extent required, items are shipped to the destination location or reserved for local pickup 676.

Finally, an invoice process 608 is conducted. In the invoice process 608, an invoice 678 is created and then settled 680 in a digital order. This process does not occur in an in-store space because store applications do not create order, and instead create sales records directly to the finance system to support financial processing, reporting, payment settlement, and inventory relief.

Figure 7:
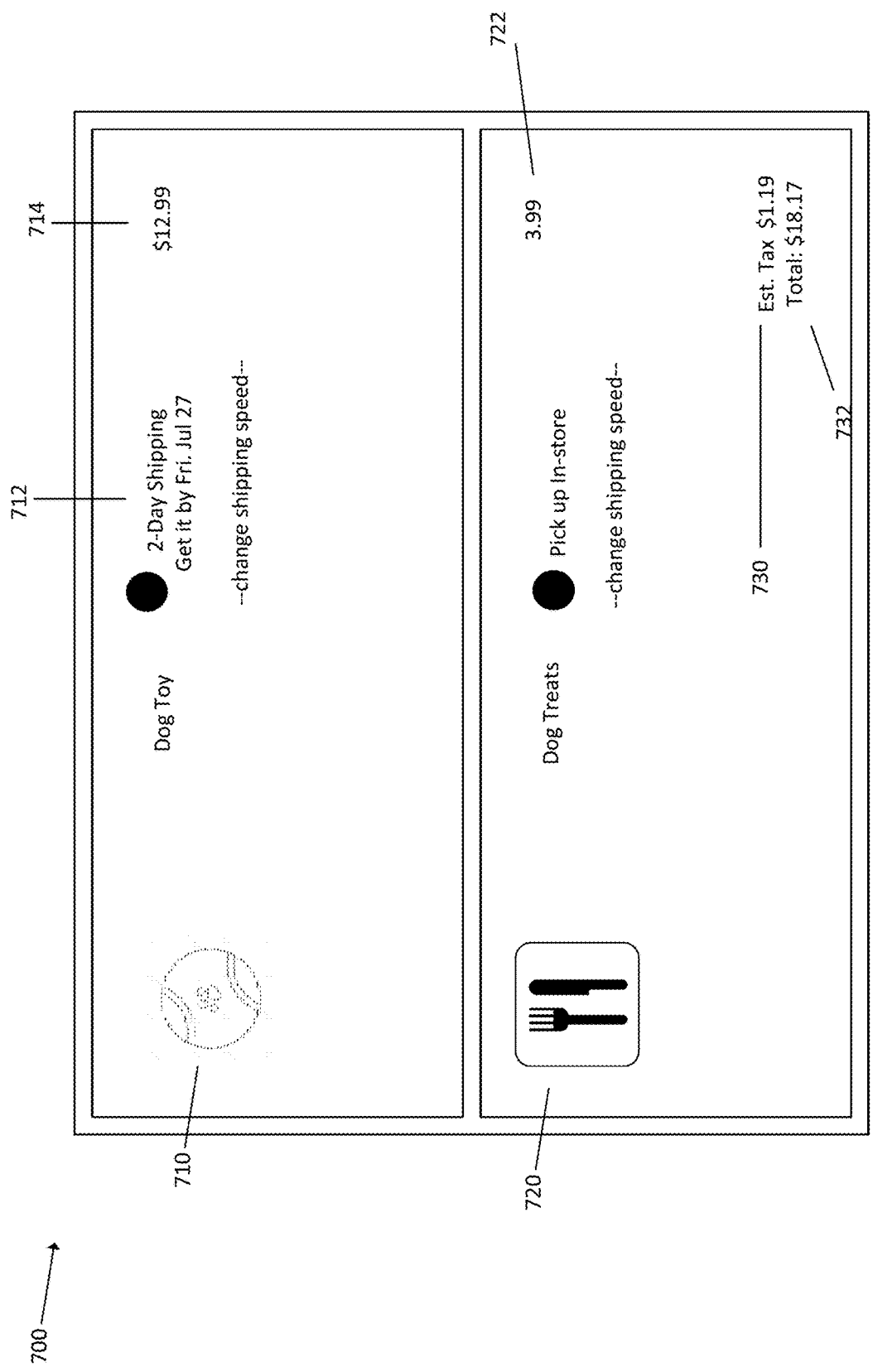
FIG. 7 displays an example user interface of an online shopping cart comprising both an item to be shipped and an item selected in-store.

FIG. 7 illustrates an example invoice 700 comprising both an in-store purchase and an online purchase. The first item 710 listed is an online purchase, which includes a delivery option 712, and a price 714. The second item 720 listed is an in-store purchase, which only includes the price 722. The invoice 700 also includes sales tax 730 and a final price 732. The online purchase and the in-store purchase are listed on the same invoice, with a single final price 732. The purchase is settled as a single transaction, even though it includes items from different tenants.

Figure 8:
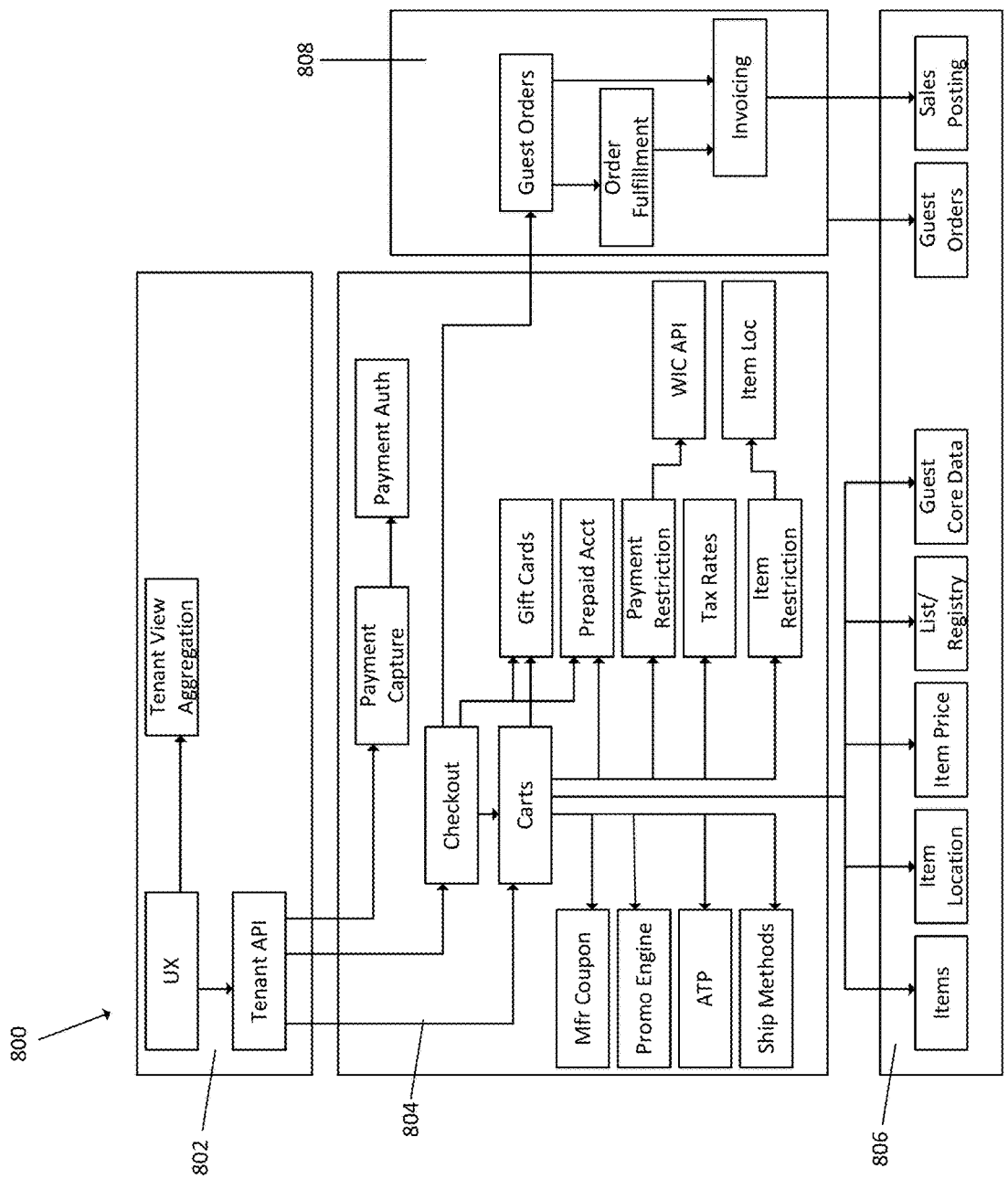
FIG. 8 illustrates an example enterprise checkout flow for in-store tenants.

FIG. 8 shows an example enterprise cart checkout flowchart 800 for store tenants. The flowchart 800 is an example showing the interaction between multiple APIs and platforms across a tenant. Not to be seen as limiting, the flowchart 800 demonstrates a basic communication model. Other examples may include more or less APIs, and further, communication between APIs shared between tenants and the enterprise cart system.

In the example shown, the enterprise checkout flowchart 800 includes tenant level stage 802, enterprise cart level stage 804, core services stage 806, and an order fulfillment stage 808.

At the tenant level stage 802, a user interface is presented to a user, where a user may be a customer or an employee. A customer may access a store tenant inventory through a website or mobile application, while an employee may access it at an in-store POS system. User experience designs communicate with tenant APIs and with tenant view aggregators. Tenant view aggregators are tenant specific view collections that allow for viewing of the user interface from a variety of tenant perspectives, and present item, price, and other assets in forward cache for use by the user experience design. Tenant APIs provide information to the user interface from the enterprise cart level stage 804, which hosting the enterprise cart architecture, including a number of shared platform APIs.

The tenant API communicates with the enterprise cart level stage 804, including with a payment capture service, a checkout service, and a carts service. The tenant API can be used to add, update, or delete items in the enterprise cart, which communicates with the cart service. Other information communicated to the cart service includes adding or updating the shipping address; adding or deleting an offer; adding, updating, or deleting payment information; and getting the cart contents. Once the cart service receives this information, the cart service communicates with other services and/or APIs. The other services/APIs, include, but are not limited to, manufacturer coupon API, promotional engine API, available to promise API, shipping methods API, store gift card API, prepaid accounts API, payment restriction API, tax rate API, and item restriction API. The payment restriction API communicates with enterprise aggregates such as WIC. The item restriction API communicates with the item-location enterprise aggregate.

In the embodiment shown, the checkout service communicates with the cart service, as well as the store gift card API, and prepaid accounts API. The checkout service also provides information to a guest order service. The guest order service is part of an order fulfillment platform 808. The order fulfillment platform 808 receives information regarding items and services, fulfillment instructions, and payment instructions associated with a guest purchase event. Within the order fulfillment platform 808, a guest order service communicates with an order fulfillment service to determine shipping information or in store pickup details. The guest order service also communicates with an invoicing service for carry out item purchases. The order fulfillment platform 808 also communicates with the invoicing API for released shipments.

The tenant API also communicates with a payment capture service, receiving payment details from the user experience design to authorize payments. The payment capture API communicates with the payment authorization API to authorize the payment.

In the embodiment shown, enterprise cart level stage 804 gathers information via the the core services stage 806. In particular, the cart service communicates with APIs exposed from the core services stage 806, such as item API, item location API, item price API, and registry API. The tenant API may also communicate directly with a core data API, such as a guest core data API that includes gathering information such as the customer address, profile, and payment information. The order fulfillment platform 808 communicates with core data APIs within the core services stage 806, such as the guest order API, and the invoicing API may communicate with the APIs within the core services stage 806.

In particular, in the embodiment shown, within the core services stage 806, the item API provides item level details to item services endpoints. Details include subscription eligibility, related items, taxability and tax product classification, restrictions information and descriptions. The item location API provides location specific item attributes, compliance program information, and selling rules associated with a specific location and product. In conjunction with the item prices API, a list price or sales price is retrieved. The item prices API retrieves list price or sales price information depending on the context of the cart being managed. Furthermore, a registry API functions to look up and validate gift registry information associated with items in the cart.

Figure 9:
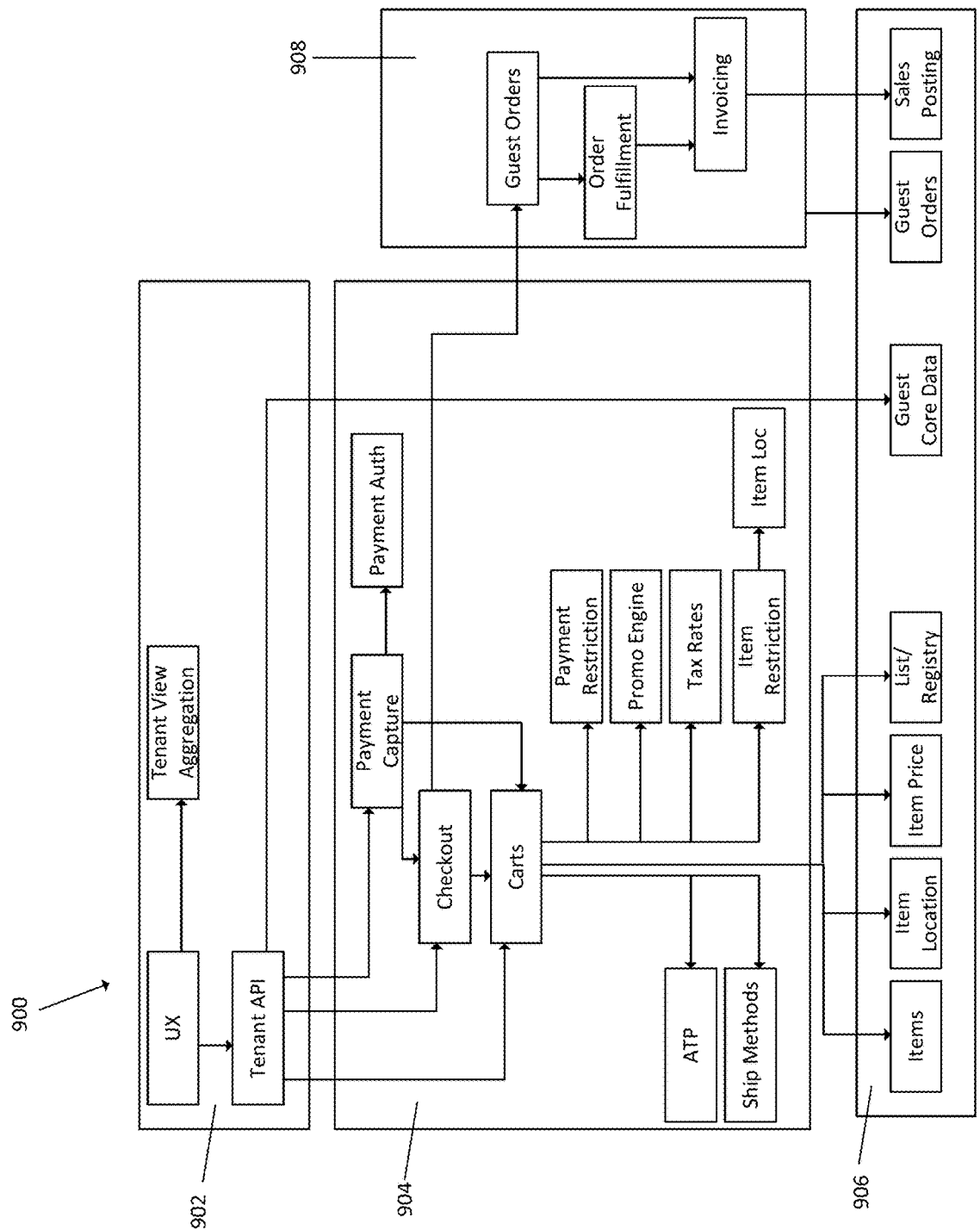
FIG. 9 illustrates an example enterprise checkout flow for digital tenants.

FIG. 9 shows a flowchart of a method 900 useable to perform an example enterprise cart checkout process for digital tenants (as compared to the method 800 of FIG. 8, for in-store tenants). At the tenant level stage 902, user experience designs are presented to a user, where a user may be a customer accessing an inventory of a retailer online using a computer or other mobile device. User experience designs communicate with tenant APIs and with tenant view aggregators. Tenant view aggregators are tenant specific aggregation databases that present item, price, and other assets in forward cache for use by the user experience design. Tenant APIs communicate with other platform shared APIs within the enterprise cart level stage 904.

The tenant API communicates with a cart service within the enterprise cart level stage 904. The tenant API can be used to add, update, or delete items in the enterprise cart, which communicates with the cart API. Other information communicated to the cart API includes adding or updating the shipping address, adding or deleting an offer, adding, updating, or deleting payment information; and getting cart contents. Once the cart API receives this information, the cart communicates with other APIs. The other APIs include, but are not limited to, available to promise API, shipping methods API, payment restriction API, promotional engine API, tax rate API, and item restriction API. The item restriction API communicates with the item-loc enterprise aggregate.

The tenant API also communicates with a checkout service. The checkout service communicates with the cart API and a guest order API. The guest order API is part of a subset of fulfillment platform APIs within the order fulfillment platform 908. The fulfillment platform API within the order fulfillment platform 908 functions to receive information regarding items and services, fulfillment instructions, and payment instructions associated with a guest purchase event. The guest order API communicates with an order fulfillment API to determine shipping information or in store pickup details. The guest order API also communicates with an invoicing API for carry out item purchases. The order fulfillment API also communicates with the invoicing API for released shipments.

The tenant API also communicates with a payment capture API, by receiving payment details from the user experience design to authorize payments. The payment capture API communicates with the payment authorization API to authorize the payment. The payment capture API can also add or update the payment information to the enterprise cart API.

Core data APIs within the core services stage 906 are also used to gather item information by the platform shared APIs within the enterprise cart level stage 904. The cart API communicates with core data APIs within the core service stage 906, such as item API, item location API, item price API, and registry API. The tenant API may also communicate directly with a core data API 906, such as a guest core data API that includes gathering information such as the customer address, profile, and payment information. The fulfillment platform 908 communicates with core data APIs within the core services stage 906, such as the guest order API, and the invoicing API may communicate with these core data APIs.

Figure 10:
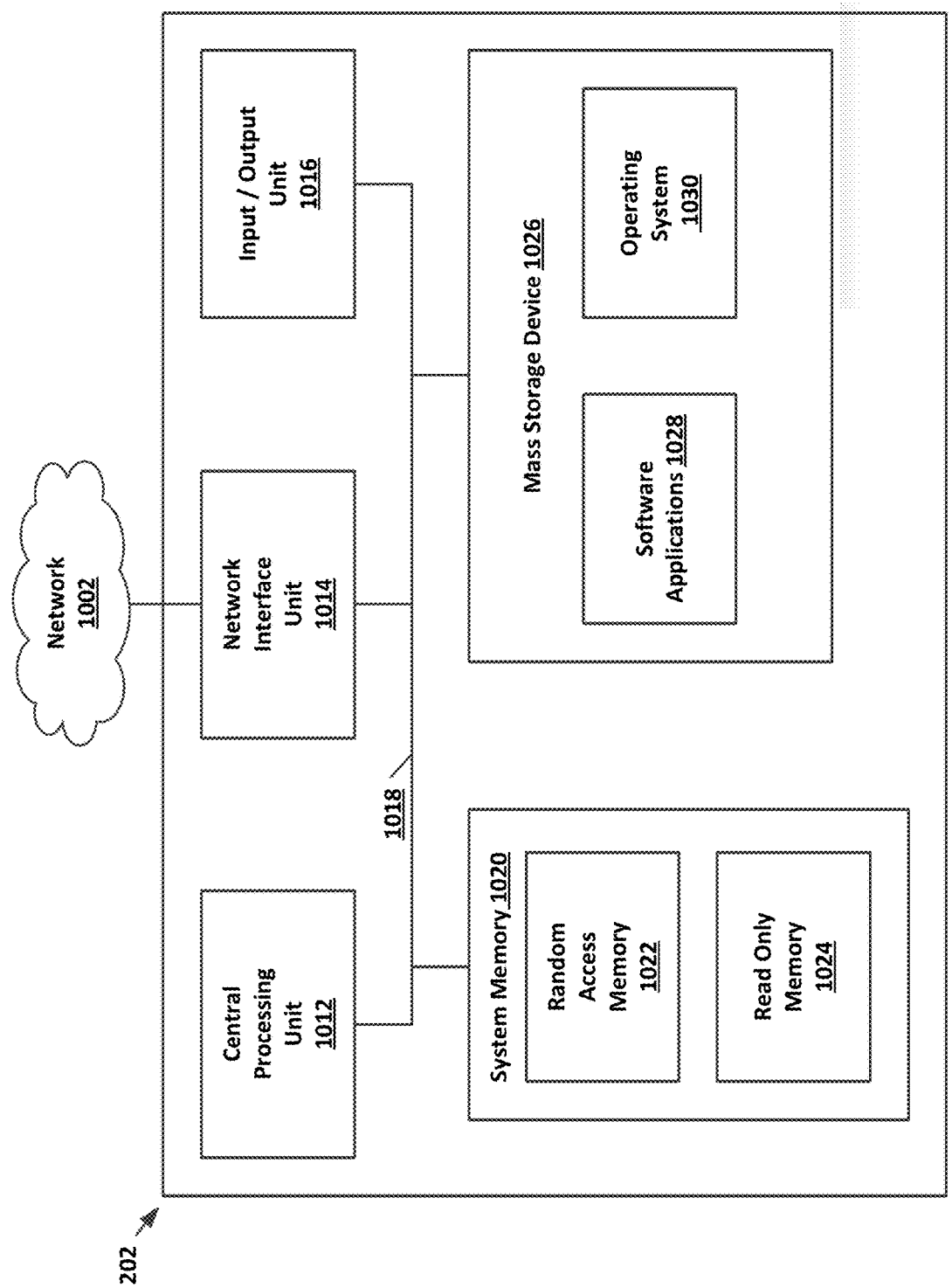
FIG. 10 illustrates a computing system usable in the enterprise cart management system.

Referring now to FIG. 10, an example block diagram of a computing system 202 is shown that is useable to implement aspects of the enterprise management system 200 of FIG. 2. In the embodiment shown, the computing system 202 includes at least one central processing unit ("CPU") 1012, a system memory 1020, and a system bus 1018 that couples the system memory 1020 to the CPU 1012. The system memory 1020 includes a random access memory ("RAM") 1022 and a read-only memory ("ROM") 1024. A basic input/output system that contains the basic routines that help to transfer information between elements within the computing system 202, such as during startup, is stored in the ROM 1024. The computing system 202 further includes a mass storage device 1026. The mass storage device 1026 is able to store software instructions and data.

The mass storage device 1026 is connected to the CPU 1012 through a mass storage controller (not shown) connected to the system bus 1018. The mass storage device 1026 and its associated computer-readable storage media provide non-volatile, non-transitory data storage for the computing system 202. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 1012 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 202.

According to various embodiments of the invention, the computing system 202 may operate in a networked environment using logical connections to remote network devices through a network 1002, such as a wireless network, the Internet, or another type of network. The computing system 202 may connect to the network 1002 through a network interface unit 1014 connected to the system bus 1018. It should be appreciated that the network interface unit 1014 may also be utilized to connect to other types of networks and remote computing systems. The computing system 202 also includes an input/output unit 1016 for receiving and processing input from a number of other devices, including a touch user interface display screen, or another type of input device. Similarly, the input/output unit 1016 may provide output to a touch user interface display screen or other type of output device.

As mentioned briefly above, the mass storage device 1026 and the RAM 1022 of the computing system 202 can store software instructions and data. The software instructions include an operating system 1030 suitable for controlling the operation of the computing system 202. The mass storage device 1026 and/or the RAM 1022 also store software instructions, that when executed by the CPU 1012, cause the computing system 202 to provide the functionality discussed in this document. For example, the mass storage device 1026 and/or the RAM 1022 can store software instructions that, when executed by the CPU 1012, cause the computing system 202 to receive and analyze inventory and demand data.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. An enterprise checkout system comprising:
   a computing system including at least one computing device, the computing system having at least one processor communicatively coupled to a memory subsystem storing instructions which, when executed, implement:
   a unified shopping cart communicatively connected to a plurality of service APIs, the plurality of service APIs exposing each of a plurality of corresponding services providing item or transaction attribute data useable in a sales transaction; and
   a plurality of tenant interfaces communicatively interfaced to the unified shopping cart,
   wherein the unified shopping cart is configured to:
      receive a first request from a first tenant interface, wherein the first tenant interface is associated with a first sales channel and the first request includes a customer identifier, a selection of one or more items, and a desired delivery mode;
      receive a second request from a second tenant interface, wherein the second tenant interface is associated with a second sales channel and the second request includes the customer identifier and a selection of one or more items;
      identify the customer identifier of the first request and the second request as being associated with the same customer;
      in response to the first request and second request, modify a collection of one or more items included in the unified shopping cart; and
      settle a single unified payment transaction associated with the first request and second request, the single unified payment transaction being based on the collection of one or more items in the unified shopping cart associated with the customer identifier.

2. The enterprise checkout system of claim 1, wherein the second tenant interface associated with the second sales channel being different from the first tenant interface associated with the first sales channel.

3. The enterprise checkout system of claim 2,
   wherein the first request comprises a first desired delivery mode,
   wherein each item of the collection of one or more items is associated with either the first request or the second request, and
   wherein the unified shopping cart is further configured to determine that the first desired delivery mode corresponds to a second delivery mode for at least one item associated with the second request.

4. The enterprise checkout system of claim 2, wherein the first tenant interface is associated with a first sales channel and the second interface is associated with a second sales channel, the second sales channel being different from the first sales channel.

5. The enterprise checkout system of claim 4, wherein the first sales channel is associated with a point of sale system.

6. The enterprise checkout system of claim 4 wherein the second sales channel is associated with a digital interface.

7. The enterprise checkout system of claim 6, wherein the second interface is a third party tenant interface.

8. The enterprise checkout system of claim 7, wherein the second digital comprises is a cart widget embedded into the third party tenant interface.

9. The enterprise checkout system of claim 1, wherein the plurality of service APIs are selected from the group comprising: an available to promise API, a cart API, a checkout API, a coupon API, an item API, and item location API, an item price API, an item location price API, a location API, a manufacturer coupon engine API, a payment gateway API, a payment restriction API, a prepaid accounts API, an item restriction API, a promotional engine API, a registry API, a return authorization API, a shipping method API, a gift card API, and a tax rate API.

10. The enterprise checkout system of claim 1, wherein the unified shopping cart is communicatively connected to a plurality of tenant APIs, the plurality of tenant APIs selected from a web checkout API, a marketplace checkout API, a store checkout API, a payment capture API, and a payment web API.

11. The enterprise checkout system of claim 1, where the unified shopping cart is further configured to receive a second request from the one or more of the plurality of tenant interfaces, wherein the tenant interface receiving the second request is different than the tenant interface receiving the first request.

12. A method for processing an order, the method comprising:
receiving, at a unified shopping cart, a first request from a first tenant interface of a plurality of tenant interfaces,
wherein the first tenant interface is associated with a first sales channel, and
wherein the first request comprises a first customer identifier, a first selection of one or more items, and a desired delivery mode;
receiving, at the unified shopping cart, a second request from a second tenant interface of a plurality of tenant interfaces,
wherein the second tenant interface is a different type of tenant interface from the first tenant interface,
wherein the second tenant interface is associated with a second sales channel different from the first sales channel, and
wherein the second request comprises a second customer identifier and a second selection of one or more items;
identifying the first customer identifier and the second customer identifier as being associated with a same customer;
based on identifying the second customer identifier and the first customer identifier as being associated with the same customer, performing a single checkout process including settling a single unified payment transaction including items identified in the first request and the second request, thereby providing, to the same customer, the first selection of one or more items associated with the first sales channel and the second selection of one or more items associated with the second sales channel.

13. The method of claim 12, further comprising, prior to settling the single unified payment transaction, determining that the desired delivery mode identified in the first request corresponds to a delivery mode for at least one item identified in the second request.

14. The method of claim 12, wherein the second request is received from an embedding at a third party retail website.

15. The method of claim 14, wherein the second request is received from an embedded cart widget at the third party retail website.

16. The method of claim 12, wherein the unified shopping cart is communicatively connected to a plurality of service APIs, the plurality of service APIs exposing each of a plurality of corresponding services providing item or transaction attribute data useable in a sales transaction, wherein settling the single unified payment transaction further comprises calling one or more of the service APIs.

17. The method of claim 12, wherein receiving the first request occurs at a first time, and wherein settling the single unified payment transaction occurs at a second time after the first time.

18. The method of claim 12, wherein the single unified payment transaction is initiated by a third party service provider.

19. The method of claim 12, wherein the first request is received from a digital tenant interface, and the second request is received from a second digital tenant interface, wherein the digital tenant interface is different from the second digital interface.

20. The method of claim 12, wherein the second request further comprises a second desired delivery mode, the second desired delivery mode being different from the delivery mode associated with the first request.

* * * * *